United States Patent
Orr et al.

(10) Patent No.: US 6,822,238 B2
(45) Date of Patent: Nov. 23, 2004

(54) MONITORING

(75) Inventors: Christopher Henry Orr, Calderbridge (GB); Craig Janson Luff, Calderbridge (GB); Thomas Dockray, Calderbridge (GB); Duncan Whittemore Macarthur, Los Alamos, NM (US)

(73) Assignee: British Nuclear Fuels PLC, Risely (GB)

( * ) Notice: Subject to any disclaimer, the term of this patent is extended or adjusted under 35 U.S.C. 154(b) by 288 days.

(21) Appl. No.: 10/223,999

(22) Filed: Aug. 20, 2002

(65) Prior Publication Data

US 2002/0190217 A1 Dec. 19, 2002

Related U.S. Application Data

(63) Continuation of application No. 09/918,337, filed on Jul. 30, 2001, now abandoned, which is a continuation of application No. 09/306,903, filed on May 7, 1999, now abandoned.

(30) Foreign Application Priority Data

May 8, 1998 (GB) .............................................. 9809749
May 8, 1998 (GB) .............................................. 9809751

(51) Int. Cl.[7] .............................................. G01T 1/02
(52) U.S. Cl. .................... 250/374; 250/489; 250/505.1; 250/375
(58) Field of Search ................................ 250/374, 375, 250/489, 505.1

(56) References Cited

U.S. PATENT DOCUMENTS

| | | | |
|---|---|---|---|
| 4,426,580 A | 1/1984 | Smith | 250/374 |
| 4,814,608 A | 3/1989 | Dempsey et al. | 250/253 |
| 4,853,536 A | 8/1989 | Dempsey et al. | 250/253 |
| 4,992,658 A | 2/1991 | Ramsey et al. | 250/253 |
| 5,008,540 A | 4/1991 | Dempsey | 250/336.1 |
| 5,055,674 A | 10/1991 | Kotrappa | 250/255 |
| 5,059,803 A | 10/1991 | Kronenberg | 250/385.1 |
| 5,107,108 A | 4/1992 | Ramsey et al. | 250/253 |
| 5,126,567 A | 6/1992 | Dempsey et al. | 250/336.1 |
| 5,128,540 A | 7/1992 | Stieff | 250/255 |
| 5,184,019 A | 2/1993 | MacArthur et al. | 250/380 |
| 5,187,370 A | 2/1993 | MacArthur et al. | 250/379 |
| 5,194,737 A | 3/1993 | MacArthur et al. | 250/382 |
| 5,281,824 A | 1/1994 | MacArthur et al. | 250/380 |
| 5,311,025 A | 5/1994 | MacArthur et al. | 250/374 |
| 5,514,872 A | 5/1996 | Bolton et al. | 250/380 |
| 5,525,804 A | 6/1996 | MacArthur et al. | 250/374 |
| 5,539,208 A | 7/1996 | Overhoff | 250/379 |
| 5,550,381 A | 8/1996 | Bolton et al. | 250/380 |
| 5,663,567 A | 9/1997 | Steadman et al. | 250/382 |
| 5,679,958 A | 10/1997 | MacArthur | 250/382 |
| 5,877,502 A | 3/1999 | Koster et al. | 250/382 |

FOREIGN PATENT DOCUMENTS

| | | | |
|---|---|---|---|
| GB | 1090745 | 3/1965 | 39/30 |
| GB | 2301222 | 11/1996 | 47/2 |
| JP | 590137875 A | 8/1985 | 1/169 |
| WO | WO 98/38531 | 9/1998 | 1/185 |

*Primary Examiner*—Albert Gagliardi
(74) *Attorney, Agent, or Firm*—Workman, Nydegger & Seeley

(57) ABSTRACT

The invention provides apparatus and methods which facilitate movement of an instrument relative to an item or location being monitored and/or the item or location relative to the instrument, whilst successfully excluding extraneous ions from the detection location. Thus, ions generated by emissions from the item or location can successfully be monitored during movement. The technique employs sealing to exclude such ions, for instance, through an electro-field which attracts and discharges the ions prior to their entering the detecting location and/or using a magnetic field configured to repel the ions away from the detecting location.

28 Claims, 4 Drawing Sheets

MONITORING

CROSS-REFERENCE TO RELATED APPLICATIONS

This application is a continuation of U.S. patent application Ser. No., 09/918,337 filed Jul. 30, 2001, now abandoned, which is a continuation of U.S. patent application Ser. No. 09/306,903, filed May 7, 1999, now abandoned, which claims priority to Great Britain Application Nos. 9809751.2, filed May 8, 1998 and 9809749.6, filed May 8, 1998, which applications are incorporated herein by specific reference.

STATEMENT REGARDING FEDERALLY SPONSORED RESEARCH OR DEVELOPMENT

The U.S. Government has a paid-up license in this invention and the right in limited circumstances to require the Patent owner to license others on reasonable terms as provided by the terms of CRADA No. LA96C 10298 and Contract No. W-7405-ENG-36 awarded by the U.S. Department of Energy.

BACKGROUND OF THE INVENTION

1. The Field of the Invention

This invention concerns improvements in and relating to monitoring, particularly, but not exclusively for alpha emitter contamination on surfaces and/or long items.

2. The Relevant Technology

Instruments for detecting alpha emission are known but they are restricted in their applicability. Techniques in which the detector must be brought into very close proximity with the entire surface of the item to be monitored, i.e., closer than 5 cm, are problematical in implementing and time consuming to operate.

Other detectors, based around the detection of ions generated by alpha particle emission, are restricted to applications in which the item to be monitored is small enough to be completely enclosed for the purposes of monitoring.

BRIEF SUMMARY OF THE INVENTION

The present invention aims to provide a system for monitoring surfaces and/or large and particularly long items effectively whilst obtaining a true and accurate reading.

According to a first aspect of the invention we provide an instrument for monitoring alpha emitting sources on an item or location, the instrument comprising a detecting chamber defining a detecting volume, the detecting chamber being provided with an opening/inlet to which portions of the item or location can be presented, and with one or more electrodes for discharging ions produced in the detecting volume, the instrument further being provided to monitor ions discharged on the electrode(s), the opening/inlet to the detecting chamber being open to the presentation or passage of different portions of the item or location whilst sealing means are provided to reduce, and preferably at least substantially eliminate, the passage of ions from outside the detecting volume to within the detecting chamber.

In this way the presentation of an item or location to the instrument is possible, whilst avoiding false readings from ambient ions.

The detection chamber may be provided with an opening in one side. The opening may form a part or the whole of that side. The detection chamber may be in the form of a hood. The item/location may pass across the front of the opening.

A gap between the edges of the chamber and the item/location may be provided.

The detecting chamber may be provided with an inlet and an outlet, the inlet to the detecting chamber being open to the passage of an item/location to be monitored from outside the chamber to inside the chamber, the inlet being closed to the passage of ions from outside the chamber to inside the chamber, the outlet from the detecting chamber being open to the passage of an item/location to be monitored from inside the chamber to outside the chamber, the outlet being closed to the passage of ions from outside the chamber to inside the chamber.

An instrument with an enclosing detecting chamber may thus be provided.

The chamber is preferably provided with an inlet and outlet on a common axis. The chamber may be cylindrical. The inlet and/or outlet may be provided in the end wall(s) of the cylinder.

The inlet and/or outlet may be provided within a further chamber. Preferably the inlet and outlet are each provided in a further chamber. The further chamber(s) may be provided with an opening to the surrounding environment. Preferably the further chamber aperture is axially aligned with the aperture (inlet/outlet) into the chamber. Most preferably the aperture of the inlet further chamber, the inlet to the chamber, the outlet from the chamber, and the aperture in the outlet further chamber are all axially aligned.

The inlet and/or outlet further chamber may be cylindrical.

The opening and/or inlet and/or outlet may be closed to the passage of ions into the chamber by an electric field. The sealing means may comprise means for generating an electric field.

The opening and/or inlet and/or outlet may be provided with one or more electrodes.

Where an opening is provided preferably the sealing means are provided in proximity to the gap. The sealing means may be provided around the external periphery of the gap. Continuous or a number of discrete sealing means may be provided.

Preferably the sealing means comprises one or more electrodes, most preferably planar electrode(s). The electrode(s) may be parallel to the item/location and/or to the detecting electrode.

Where an inlet and/or an outlet are provided preferably the electrode(s) are provided in further chamber(s).

An electrode extending along the axis of the inlet and/or outlet may be provided. The electrode may surround or substantially surround the axis of the inlet and/or outlet. A cylindrical electrode may be provided.

A plurality of electrodes may be provided extending along the axis of the inlet and/or outlet. The electrodes are preferably provided in opposition to at least one, and preferably all sides of the item/location. The electrodes may be provided in opposition to one another on opposing sides of the axis of the inlet and/or outlet. Two or more planar electrodes may be provided. A potential difference between the opposing electrodes may be used. Preferably the electrodes are at a different potential to the item/location. Most preferably the electrodes are at the same potential.

A potential difference between the electrode(s) and the item/location is preferably employed. Preferably the item/location is grounded or at least at a reduced potential compared with the electrode(s). Preferably an electric field of at least 50 $Vcm^{-1}$ separation between the electrode(s) and item/location is provided. A level of at least 75 Vcm$^{-1}$ and more preferably of at least 100 Vcm$^{-1}$ may be provided.

The potential may be an AC potential, but a DC potential is preferred.

The electrode(s) may be provided in proximity to the position occupied by the item/location in use. A separation of less than 20 cm may be provided, but preferably the separation is less than 10 cm or even less than 3 cm.

The opening and/or inlet and/or outlet to the chamber may be sealed to the passage of ions by a magnetic field.

Where an opening is provided preferably the magnetic field is generated around the gap and/or the periphery of the opening.

Where an inlet and/or outlet is provided preferably the magnetic field is generated within further chamber(s).

Preferably the magnetic field is configured to repel ions approaching entrance to the detecting volume and/or the inlet and/or outlet. Electromagnets and/or permanent magnets may be provided.

The detection chamber may be provided with one or more, preferably pairs of, opposing detection electrodes. Preferably the electrodes of a pair are provided such that the item passes between them. A potential difference between the opposing electrodes of a pair is preferably generated in use. An applied or electrostatic potential may be employed.

The detection chamber may be provided with one or more electrodes opposing the item/location. An applied potential or electrostatic potential may be employed.

The means for monitoring ions discharged on the electrode(s) may comprise electrostatic charge monitoring means. More preferably the means for monitoring ions discharged on the electrode(s) comprise current indicating means and more preferably current measuring means, such as an electrometer.

Preferably one or more of the electrodes is connected to an electrometer.

The item/location may be a surface, such as an area of floor, wall, ceiling, soil, rubble, part of the surface of a piece of equipment, such as a glove box, material traveling on a conveyor, or a discrete item such as a pipe, beam (such as an I beam), pole, fuel cladding, fuel element, cable, wire, rail or other elongate or large item.

The instrument may be provided with associate means for supporting the item/location and/or moving the item/location through the instrument. Such means may be provided on both sides of the instrument.

The instrument may be provided with means for supporting it on the item/location to be monitored. The support means may enable the instrument to be moved along the item and/or over the location.

According to a second aspect of the invention we provide a method of monitoring alpha emitting sources on an item or location, the method comprising presenting a portion of the item or location to an opening or inlet connected to a detecting chamber in an instrument, the detecting chamber defining a detecting volume and being provided with one or more electrodes for discharging ions produced in the detecting volume, the method including monitoring ions discharged on the electrode(s), and the method further including sealing the detecting volume against the passage of ions from outside the detecting volume to within the detecting volume, whilst allowing the presentation of different portions of the item or location to the detecting chamber.

The item may be introduced by moving the item into the detector and/or by moving the detector along the item.

The second aspect of the invention includes the features, options and possibilities set out elsewhere in this application, including the steps necessary to implement them.

According to a third aspect of the invention we provide an instrument for monitoring alpha emitting sources on an item, the instrument comprising a detecting chamber defining a detecting volume, the detecting chamber being provided with an inlet through which the item can be introduced and an outlet through which the item leaves the detecting chamber, the detecting chamber being provided with one or more electrodes for collecting ions produced in the detecting volume by the portion of the item in the detecting volume, the instrument further being provided with means to monitor ions discharged on the electrode(s).

In this way the monitoring of items considerably longer than the detecting volume, and indeed the instrument, is possible.

The detection chamber may be provided with one or more electrodes opposing the portion of the item within the detection volume. A single electrode surrounding the portion of the item is preferred.

The electrode(s) are preferably configured to the cross-sectional profile of the item being monitored. A cylindrical electrode may be provided, most preferably with its axis aligned with the axis of the item and/or instrument.

An applied, preferably externally generated, potential may be employed or an electrostatic potential may be employed.

Preferably the voltage gradient between different portions of the electrode(s) and the portion of the item is substantially constant for different portions of the a electrode and of the item.

The detection chamber may be provided with one or more pairs of opposing detection electrodes. Preferably the electrodes of a pair are provided such that the item passes between them. A potential difference between the opposing electrodes of a pair may be provided in use. Preferably a potential difference between the item and at least one of the electrodes is provided in use. An applied or electrostatic potential may be employed.

The chamber is preferably provided with an inlet and outlet on a common axis. The chamber may be cylindrical. The inlet and/or outlet may be provided in the end wall(s) of a right cylinder.

The inlet and/or outlet may lead to a further chamber externally provided to the detecting chamber. The further chamber(s) may be provided with an opening to the surrounding environment. Preferably the further chamber aperture is axially aligned with the aperture (inlet/outlet) into the detecting chamber. Most preferably the aperture of the inlet further chamber, the inlet to the chamber, the outlet from the chamber and the aperture in the outlet further chamber are all axially aligned.

The detecting chamber may have an inlet closed to the passage of ions from outside the chamber to inside the chamber and/or an outlet closed to the passage of ions from outside the chamber to inside the chamber.

The inlet and/or outlet further chambers may have an internal configuration approximately conforming to the external configuration of the item. A limited clearance, most preferably over a significant length may be provided between the internal surface of the further chamber(s) and the external surface of the item. The clearance may be less than 5 mm and more preferably less than 2 mm. The significant length may be greater than 10 cm and more preferably greater than 25 cm. The length may be at least 5 times, more preferably at least 10 times and ideally at least 20 times the minimum clearance presented.

The detection chamber may be provided with alternative means for excluding ambient ions. The atmospheric pressure in the detection chamber may be higher than the ambient atmospheric pressure.

The means for monitoring ions discharged on the electrode(s) may comprise electrostatic charge monitoring means. Preferably the means for monitoring ions discharged on the electrode(s) comprise current indicating means and more preferably current measuring means. A ground referenced electrode may be provided.

Preferably one or more of the electrodes is connected to an electrometer.

The item may be a continuous item of more than 5 cm, preferably of more than 10 m, more preferably more than 20 m and potentially 50 m or more in length.

The item may be a discrete item such as a pipe, beam (such as an I beam), pole, fuel element, cladding, cable, wire, rail or other elongate or large item or a surface, such as a material traveling on a conveyor.

The instrument may be provided with associate means for supporting the item and/or moving the item through the instrument. Such means may be provided on both sides of the instrument.

The instrument may be provided with means for supporting it on the item to be monitored. The support means may enable the instrument to be moved along and/or over the item.

According to a fourth aspect of the invention we provide a method of monitoring alpha emitting sources on an item, the method comprising introducing the item through an inlet connected to a detecting chamber in an instrument and removing the item through an outlet in the instrument, the detecting chamber defining a detecting volume and being provided with one or more electrodes for discharging ions produced in the detecting volume by the portion of the item in the detecting volume, the method including monitoring ions discharged on the electrode(s).

The item may be introduced by moving the item into the detector and/or by moving the detector along the item.

The fourth aspect of the invention includes the features, options and possibilities set out elsewhere in this application, including the steps necessary to implement them.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

The monitoring of alpha emissions from an item or location is of particular significance during decommissioning and waste management. An accurate calculation of the level of contamination present enables the item or location to be correctly classified in terms of waste grade or unrestricted release and/or the most suitable decontamination process.

Figure 1:
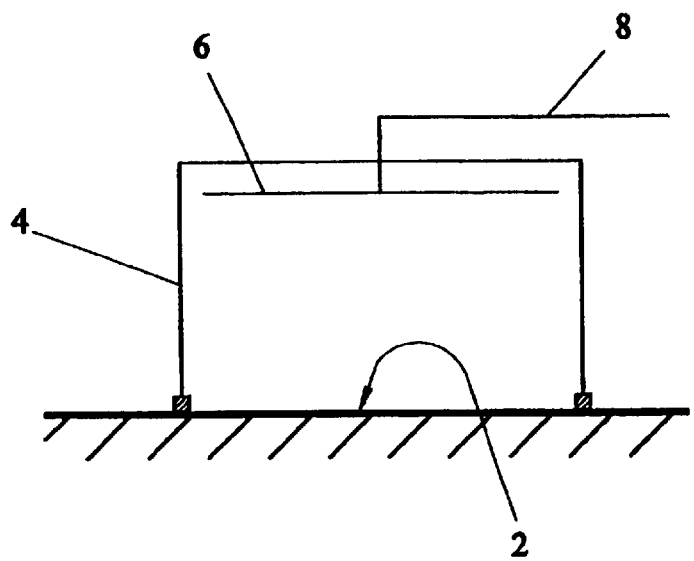
FIG. 1 illustrates schematically a prior art alpha detection instrument.

Alpha determination for discrete areas of surfaces, such as floors, are known in terms of the type of instrument schematically illustrated in FIG. 1.

The instrument uses the principle that where direct alpha particle detection is not practicable, detection of alpha particles emitted into air from the item can successfully be indirectly monitored. Whilst alpha particles only travel a few centimeters in air and, as a consequence, a detector unit at any distance from the item cannot detect alpha particles directly, during the course of their travel through the air the alpha particles cause ionization of a significant number of air molecules. These ionized molecules remain in that state for a substantial period of time and this is sufficient to enable them to be attracted from in proximity with the item to a detector array.

Thus in the instrument of FIG. 1 an area of floor 2 is enclosed within a chamber 4 which effectively forms a hood over the area of floor 2 to be monitored. The chamber 4 contains a detector array 6 to which an electric potential is applied via lead 8.

The detector array 6 employs the electric field generated between the array 6 and the grounded floor 2 to attract the charged ions formed by the alpha particles to the array 6 or the floor 2 depending on their polarity. The current resulting from these ions is detected by an electrometer so as to give a measure of the ion level presence and hence the alpha contamination presence.

The instrument excludes externally generated ions by scaling the clearance between the floor 2 and the hood 4.

While such systems are suitable for relatively small item analysis they do not offer suitable system for analyzing larger items which cannot practicably be enclosed within the detection instrument.

Figure 2:
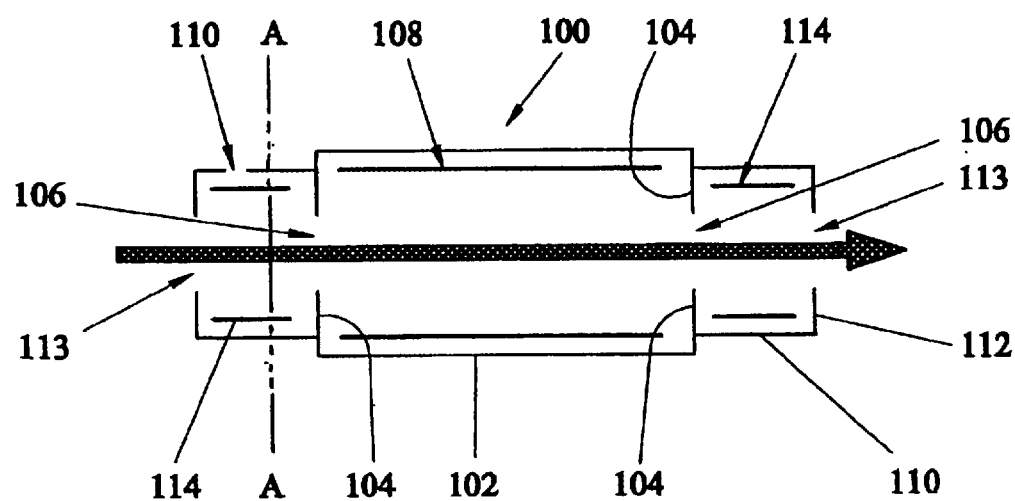
FIG. 2 illustrates an instrument according to a first embodiment of the present invention.
Figure 3:
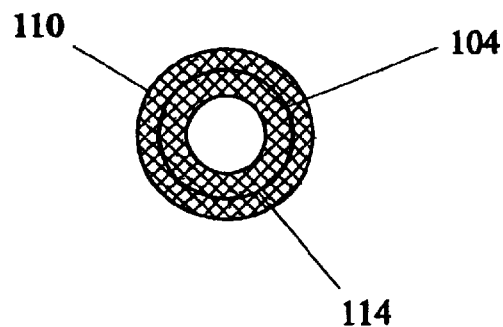
FIG. 3 illustrates a cross-section through FIG. 2 along line A—A.

To successfully monitor large items, including I-section beams, cables, rails and other elongate items, a detector of the type embodying the invention, and illustrated in FIG. 2 can be employed.

The instrument 100 comprises an elongate central portion 102 of rectilinear cross-section. The portion 102 is provided with end faces 104 which define apertures 106 lying on the axis of the portion 102. The apertures 106 allow the passage of an elongate item to be measured through the portion 102.

The portion 102 is itself provided with a pair of planar electrode plates 108 spaced, and thereby electrically insulated, from the wall of portion 102.

The item passes through the electric field generated between the opposing plates 108 and as a consequence ions are attracted away from the item to the plates 108 in a direction depending on their polarity. The ions generated by alpha emission from the article and attracted to the electrodes 108 give rise to a current which can be measured using an electrometer, not shown.

The above embodiment employs a cylindrical electrode to monitor, preferably, cylindrical items, but the electrode array can be configured to the particular type of item under consideration. Thus an I-beam cross-section could be monitored using electrodes spaced from the end surfaces and closer together electrodes space from the intervening web portion. Uniform spacing from the item is preferred.

Air, however, includes extraneous ions of its own and as a consequence these must be excluded from detection at the electrodes 108 if a true measurement of the alpha particle generated ionization is to be achieved. The detection currents employed are around $10^{-12}$ A and as a consequence easily distorted by extraneous ions.

In the prior art systems this was achieved by sealing the chamber against the area to be measured and by waiting for preexisting ions to recombine and hence be removed from the possibility of measuring. In other forms sealed chambers, from which the ambient ions could readily be excluded, by using a filter which closed off the air flow route into the instrument, were used. These options, however, are not viable where the chamber is moved rapidly over different locations and/or where the elongate item exceeds the length of the measuring portion 102 and thus rendering filters over the air inlet impractical.

To counteract this problem the present invention provides for a further cylindrical body portion 110 on each end of the portion 102. These body portions 110 extend from the end faces 104 of the portion 102 to end faces of their own 112. These end faces 112 are in turn provided with apertures 113 which allow access to the elongate item to be measured.

To exclude extraneous ions from the external air these cylinders 110 are each provided with a cylindrical electrode 114.

An applied potential on the electrode 114 in these cylinders 110 provides an electrostatic screen to any ions which attempt to enter the portion 102 where the measurement will actually be performed. Ions of one polarity are repelled and maintained outside the seal. Ions of the other polarity are attracted to the electrodes and discharged prior to entering the portion 102. As a consequence movement of the elongate member into the detector is not hindered, but any air passage occurs without introducing extraneous ions.

Figure 4:
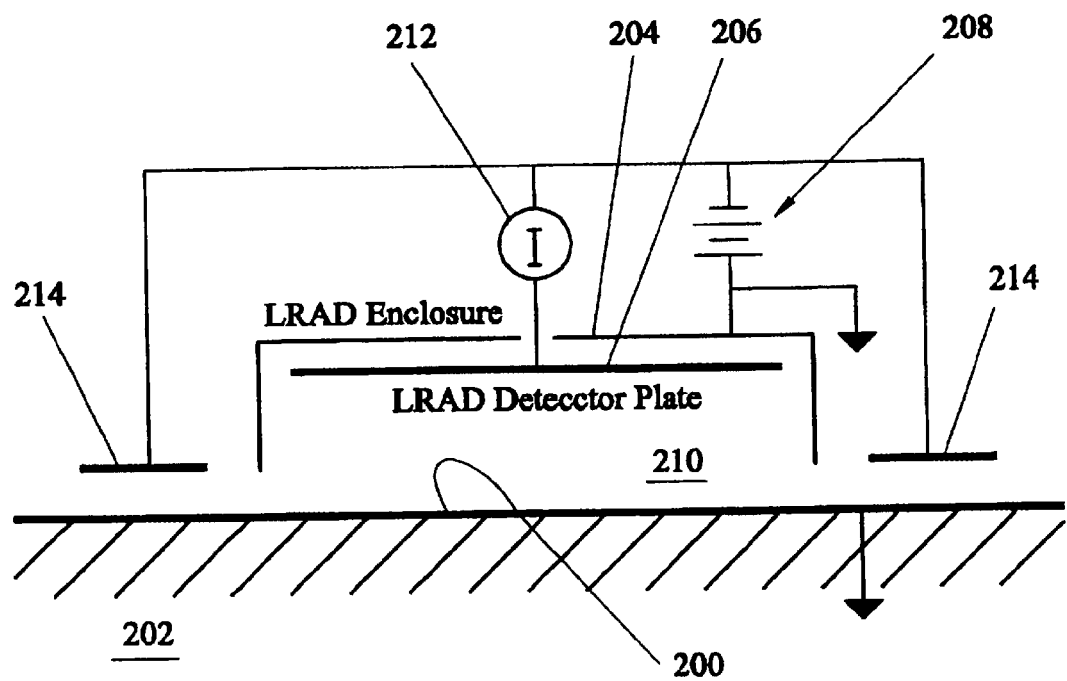
FIG. 4 illustrates an instrument according to a second embodiment of the invention.

Whilst the system has been discussed in this embodiment in relation to a fixed instrument through which the elongate item is moved, for instance on a conveying roller bed, the instrument is equally applicable to embodiments in which the instrument itself moves, for instance over surfaces, as illustrated in FIG. 4.

In this embodiment an area 200 of a much larger overall floor area 202 is enclosed within a hood style container 204. The hood 204 contains a collector electrode 206 which is held at a potential difference relative to the grounded floor by power source 208. The potential difference causes ions formed within the hood volume 210 to be attracted to the electrode 206 and give rise to a current measured by ground referenced electrometer 212.

To exclude ambient ions present in the surrounding air, during movement of the instrument and indeed when stationary, the hood 204 is surrounded by one or more sealing plates 214. These sealing plates are at an elevated potential relative to the floor 202 and exclude ions in the manner outlined above, by attracting them to the sealing plates 214 or promoting their discharge to ground depending on their polarity.

To illustrate the effectiveness of the technique, an alpha detector of the general type outlined in FIG. 4 was employed in a series of tests. The 50×50 cm electrostatic detector was surrounded by an 8 cm wide electrostatic skirt, with an electric field generated between the skirt and the grounded surface beneath the instrument being used to exclude externally generated ions from the detection chamber.

Initial tests were performed with the detector resting on the grounded surface and with no seal voltage applied. A 180 Bq $Am^{241}$ source was placed approximately in the center of the region under the detector and the response to background and source were measured, the results giving a background reading of −43.4+/−2.8 mV and a source reading of 161.6+/−19.O mV.

Following calibration the limit of detection (LoD) was calculated from a variety of raw results using the relationship $$LoD=3\sqrt{2}\sigma_b \div eff=3.75\sigma_b$$

where $\sigma_b$ is measured in mV and is the standard deviation of the background response; and LoD is in Bq.

Figure 5:
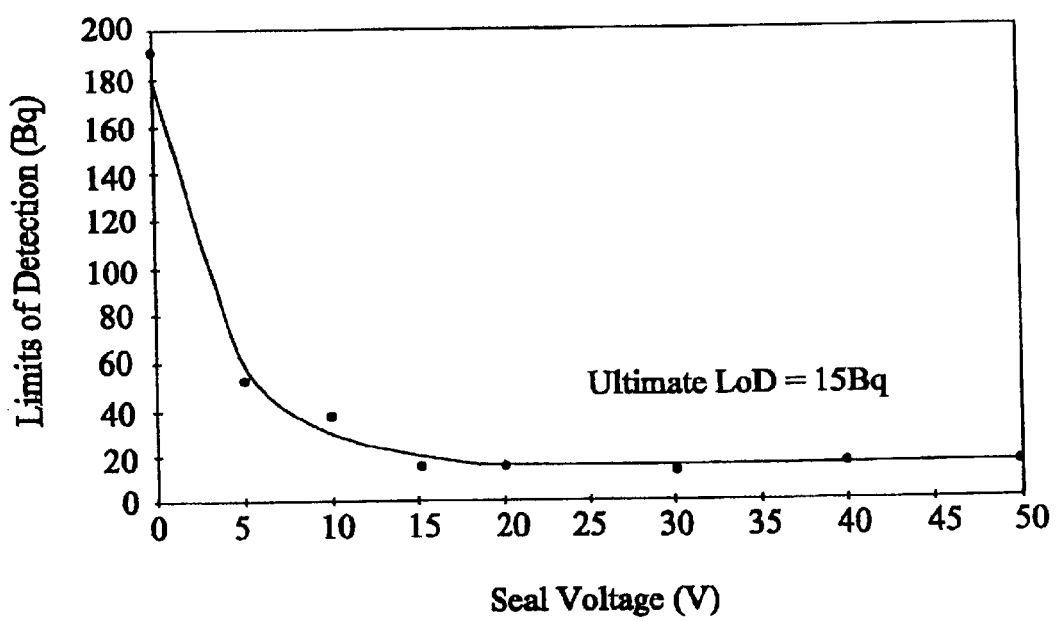
FIG. 5 illustrates the limit of detection results against seal voltage for a first gap separation using an instrument according to the present invention.

The variation in LoD with a gap of 7 mm+/−1 mm and with a heat gun generating ions 5 cm away from the gap between the exterior and interior of the instrument is illustrated in FIG. 5.

The response indicates that the LoD can be substantially reduced where a seal voltage is applied and the extraneous ion are excluded as a result.

Figure 6:
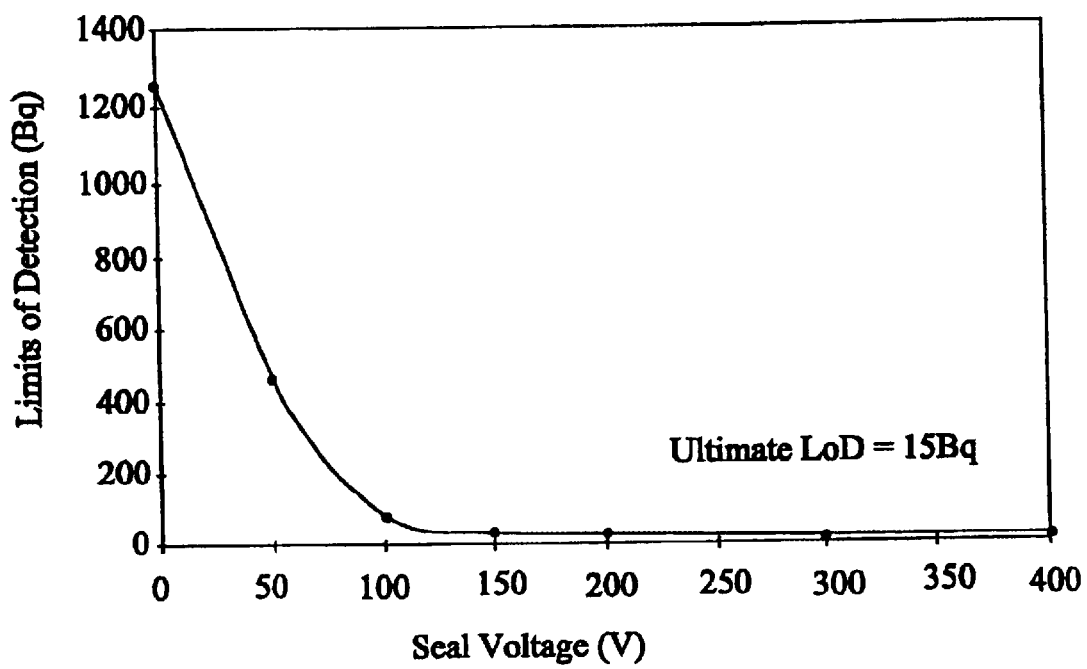
FIG. 6 illustrates the limit of detection against seal voltage for a larger gap than the test of FIG. 5.

FIG. 6 presents similar measurements for a 30+/−1 mm gap with the air gun 10 cm away from this gap.

Variations between the magnitude of the ion source in this Figure and FIG. 5 prevent direct comparison, but the exclusion of the ions is substantially demonstrated.

Figure 7:
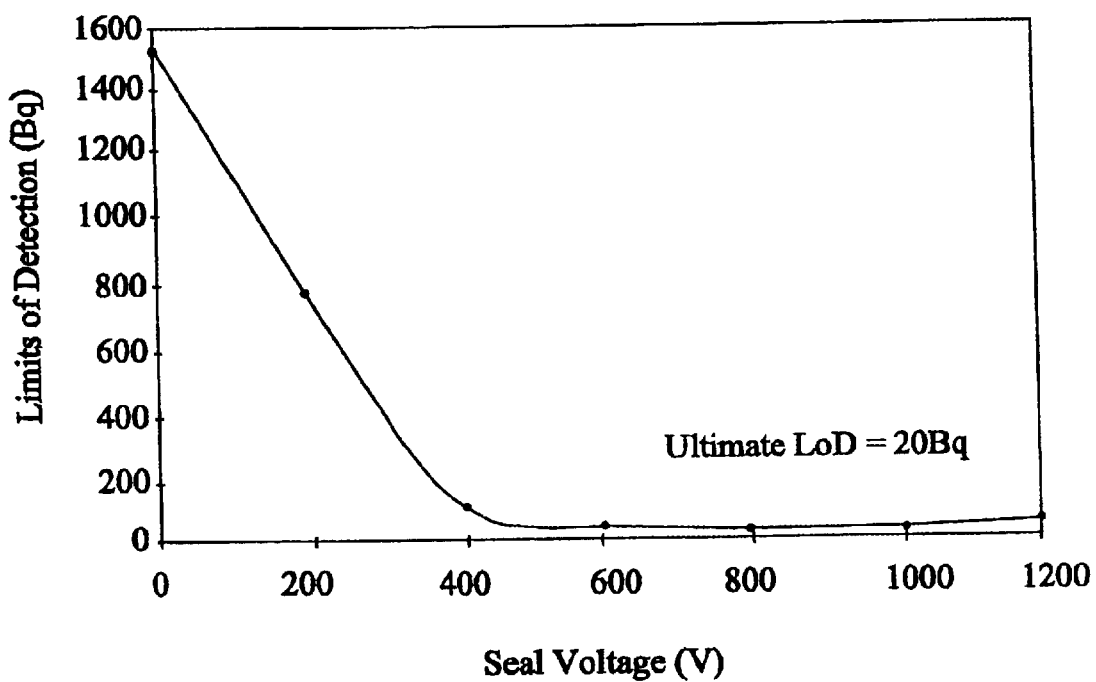
FIG. 7 illustrates the limit of detection against seal voltage for a still larger gap using an instrument according to the invention.
Figures 8, 9, 10:
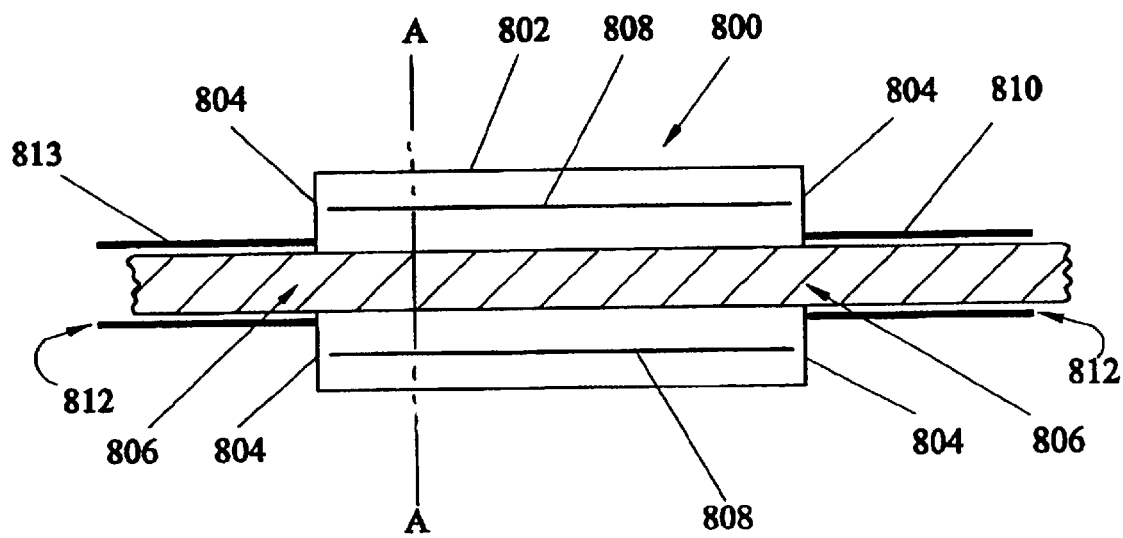
FIG. 8 illustrates an instrument according to a further embodiment of the present invention.
FIG. 9 illustrates a cross-section through FIG. 8 along line A—A.
FIG. 10 illustrates an instrument according to a still further embodiment of the invention.

As illustrated in FIG. 7 increasing the voltage still further allows substantial gaps, in this case 105 mm+/−3 mm to be successfully accommodated.

In a further embodiment of the invention, not illustrated, the use of a strong magnetic field can be used to exclude ions which attempt to enter the measuring chamber. Permanent or electromagnets can be used in this regard.

As an alternative to the way of excluding ions illustrated in FIG. 2, it is possible to physically counteract this problem. The present invention provides for a further body portion 810 on each end of the cylinder 802. These body portions 810 extend from the end faces 804 of the cylinder 802 for a substantial length to ends 812 of their own. The aperture 813 through the body portion 810, which allows access for the elongate item to be measured, takes a form closely configured to that of the item itself, for instance a pipe (the item) passing down a slightly larger pipe (the inlet). This structure gives minimal air flow and hence minimal flow of ions into the detection In an alternative form, not shown, the ambient ions can be excluded by a slight positive pressure within the detecting chamber and/or further chambers, which promote air flow out of the instrument. Other forms, not shown, exclude ambient ions using an extended restricted clearance between the item/location and the inlet and outlet passage, for instance flexible air excluders, such as brushes, may be provided.

In a still further alternative form the "background" ions present in the air around the unit can be determined in advance of the item's passage through the instrument and/or afterwards to provide a base count which can be deducted to give a measurement of the ions arising from alpha particle emission. Such background determinations could be made with a clean, uncontaminated item corresponding to those to be analyzed.

In the above mentioned embodiments continuous movement of the item/location through the instrument is preferred.

Whilst the system has been discussed in this embodiment in relation to a fixed instrument through which the elongate item is moved, for instance on a conveying roller bed, the instrument is equally applicable to the embodiment of FIG. 4 in which the instrument itself moves.

In this embodiment an elongate item 900, for instance a railway rail, is being analyzed by an instrument 902 formed of a first measuring cylinder portion 904 and air excluding body portions 906. As with the first embodiment of the invention the measuring cylinder 904 is provided with a cylindrical electrode 908 to detect ions generated by alpha particle emission whilst within the cylinder 904.

The entire instrument is supported on the item to be monitored 900 by wheels 912 which can be driven to advance the unit along the item 900. Signals from the instrument 902 relating to its position and the level of alpha detection are sent to a remote monitoring unit, not shown.

The embodiments of the invention described above address alpha particle determinations but it is perfectly possible to incorporate gamma and/or beta detectors in such an instrument alternatively or additionally. Beta detection can be undertaken directly or alternatively by calculation from the gamma emissions recorded The embodiments of the invention described above address alpha particle determinations but it is perfectly possible to incorporate gamma and/or beta detectors in such an instrument alternatively or additionally. The gamma detector may be of the plastic scintillator type, sodium iodide type, or semiconductor type. Beta detection can be undertaken directly or alternatively by calculation from the gamma emissions recorded.

This type of monitoring renders full analysis of long items (10 meters +) possible, whilst avoiding the cost and practical difficulties of enclosing large items, and facilitating continuous fed of the item through the monitor. The instrument is suitable for items such as cables, wires, beams, pipes, rails, indeed any item or location having a conductivity capable of carrying the currents involved.

The instrument also provides spatial information as to the location and/or spread of any alpha emitting sources present.

What is claimed is:

1. An instrument for monitoring alpha emitting sources on an item or location, the alpha emitting sources emitting alpha particles that produce ions, the instrument comprising:

a housing bounding a chamber, an opening being formed on the chamber so as to provide fluid communication between the chamber and exterior of the housing;

at least one electrode disposed in the chamber for discharging ions within the chamber;

a monitor for monitoring the ions discharged in the chamber; and means for forming a seal between the housing and a portion of the item or location disposed exterior of the housing, the seal being adapted to bound a segment of the item or location such that alpha particles from the segment or ions produced by those alpha particles are free to be monitored in the chamber, the seal reducing the passage of ions from exterior of the seal into the chamber while enabling the housing or the item or location to freely move relative to the other, the means for forming a seal comprising an electric field, a magnetic field, or positive pressure within the chamber.

2. The instrument as recited in claim 1, wherein the means for forming the seal comprises one or more electrodes mounted to the housing.

3. The instrument as recited in claim 2, wherein the one or more electrodes forming the seal are substantially parallel to the item or location.

4. The instrument as recited in claim 1, wherein the item or location is at a reduced potential compared with the at least one electrode disposed in the chamber for discharging ions within the chamber.

5. The instrument as recited in claim 1, wherein the item or location is grounded compared with the at least one electrode disposed in the chamber for discharging ions within the chamber.

6. The instrument as recited in claim 1, wherein the housing comprises a hood having an annular skirt.

7. The instrument as recited in claim 6, wherein the means for forming the seal is mounted on the skirt.

8. The instrument as recited in claim 1, wherein the monitor comprises an electrostatic charge monitor.

9. The instrument as recited in claim 1, wherein the monitor comprises a current measuring monitor.

10. An instrument for monitoring alpha emitting sources on an item, the alpha emitting sources emitting alpha particles that produce ions, the instrument comprising:

a housing bounding a chamber;

a first opening formed on the housing in communication with the chamber, the first opening being continually open during operation to enable the item to be freely introduced into the chamber;

an electrode disposed in the chamber for discharging ions in the chamber;

a monitor for monitoring ions discharged in the chamber; and means for forming a seal across the first opening so as to reduce the passage of ions from exterior of the housing into the chamber through the first opening while allowing the item to be freely passed through the first opening into the chamber.

11. The instrument as recited in claim 10, wherein the housing has a substantially rectilinear cross-section.

12. The instrument as recited in claim 10, wherein the electrode disposed in the chamber for discharging ions comprises a pair of electrode plates spaced apart from the housing.

13. The instrument as recited in claim 10, wherein the means for forming a seal across the first opening comprises a first electrode disposed about the first opening for forming an electrostatic barrier to ions exterior of the housing.

14. The instrument as recited in claim 10, wherein the means for forming a seal across the first opening comprises a magnetic field.

15. The instrument as recited in claim 10, wherein the means for forming a seal across the first opening comprises positive pressure inside the chamber.

16. The instrument as recited in claim 10, wherein the housing comprises a second opening in communication with the chamber, the second opening being configured such that the item can be inserted into the chamber through the first opening and can exit the chamber through the second opening.

17. The instrument as recited in claim 16, wherein the second opening is aligned with the first opening.

18. The instrument as recited in claim 16, further comprising means for forming a seal across the second opening so as to reduce the passage of ions from exterior of the housing into the chamber through the second opening while allowing the item to be freely passed through the second opening.

19. The instrument as recited in claim 18, wherein the means for forming a seal across the second opening comprises an electric field, a magnetic field, or positive pressure within the chamber.

20. The instrument as recited in claim 10, wherein the item is grounded compared to the electrode disposed in the chamber for discharging ions in the chamber.

21. The instrument as recited in claim 10, wherein the monitor comprises an electrostatic charge monitor.

22. The instrument as recited in claim 10, wherein the chamber of the housing has a transverse cross section complementary to the transverse cross section of the item being passed therethrough.

23. A method for monitoring alpha emitting sources on an item, the alpha emitting sources emitting alpha particles that produce ions, the method comprising:

passing an item having an alpha emitting source into a chamber of a housing through a first opening formed on the housing, the first opening being continually open to the item during operation;

performing a step of forming a seal across the first opening so as to reduce the passage of ions from exterior of the housing into the chamber through the first opening while allowing the item to be freely passed through the first opening into the chamber;

discharging within the chamber the ions produced by the alpha particles; and monitoring the ions discharged in the chamber.

24. A method as recited in claim 23, wherein the step of forming a seal comprises forming an electric or magnetic field across the first opening.

25. A method as recited in claim 23, wherein the step of forming a seal comprises forming a positive air pressure within the chamber.

26. A method as recited in claim 23, further comprising passing the item out of the chamber through a second opening in the housing, the second opening being spaced apart from the first opening.

27. A method as recited in claim 26, further comprising performing the step of forming a seal across the second opening so as to reduce the passage of ions from exterior of the housing into the chamber through the second opening while allowing the item to be freely passed through the second opening.

28. A method as recited in claim 23, wherein the step of forming the seal across the first opening is performed before or after the act of passing an item having an alpha emitting source in the chamber.

* * * * *

UNITED STATES PATENT AND TRADEMARK OFFICE
CERTIFICATE OF CORRECTION

PATENT NO.     : 6,822,238 B2
DATED          : November 23, 2004
INVENTOR(S)    : Orr et al.

It is certified that error appears in the above-identified patent and that said Letters Patent is hereby corrected as shown below:

Column 2,
Line 60, after "different potential" change "to" to -- than that of --.

Column 3,
Line 17, after "approaching" insert -- the --.

Column 4,
Line 32, after "different portions of the" remove "a".

Column 6,
Line 50, before "suitable system" insert -- a --.

Column 7,
Line 11, after "electrodes" change "space" to -- spaced --.
Line 22, after "In other forms" insert -- , --.
Line 24, after "excluded" remove ",".

Column 9,
Line 43, before "of the item" change "fed" to -- feed --.

Signed and Sealed this

Eighth Day of November, 2005

JON W. DUDAS
*Director of the United States Patent and Trademark Office*